US012805663B2

(12) United States Patent
Epping

(10) Patent No.: US 12,805,663 B2
(45) Date of Patent: Nov. 24, 2026

(54) METHOD AND APPARATUS FOR PRODUCING TEMPERATURE-CONTROLLED MILK FOAM AND/OR MILK

(71) Applicant: CUP & CINO KAFFEESYSTEM-VERTRIEB GMBH & CO. KG, Hövelhof (DE)

(72) Inventor: Frank Josef Paul Epping, Hövelhof (DE)

(73) Assignee: CUP & CINO KAFFEESYSTEM-VERTRIEB GMBH & CO. KG, Hövelhof (DE)

( * ) Notice: Subject to any disclaimer, the term of this patent is extended or adjusted under 35 U.S.C. 154(b) by 573 days.

(21) Appl. No.: 18/273,569

(22) PCT Filed: Feb. 28, 2022

(86) PCT No.: PCT/EP2022/055022

§ 371 (c)(1),
(2) Date: Jul. 21, 2023

(87) PCT Pub. No.: WO2022/207207

PCT Pub. Date: Oct. 6, 2022

(65) Prior Publication Data

US 2024/0090699 A1 Mar. 21, 2024

(30) Foreign Application Priority Data

Mar. 30, 2021 (EP) .................................... 21165867

(51) Int. Cl.
*A47J 31/44* (2006.01)

(52) U.S. Cl.
CPC ................................ *A47J 31/4485* (2013.01)

(58) Field of Classification Search
None
See application file for complete search history.

(56) References Cited

U.S. PATENT DOCUMENTS

2014/0360208 A1* 12/2014 Sadot .................... F25D 31/002 62/3.3
2019/0000263 A1 1/2019 Knip
(Continued)

FOREIGN PATENT DOCUMENTS

DE 102017123642 A1 4/2019
EP 3610762 A1 2/2020
(Continued)

OTHER PUBLICATIONS

International Search Report (Jun. 3, 2022) for corresponding International App. PCT/EP2022/055022.

*Primary Examiner* — John J Norton
(74) *Attorney, Agent, or Firm* — WOMBLE BOND DICKINSON (US) LLP

(57) ABSTRACT

A method for selectively producing cold, warm or hot milk foam and/or milk includes providing at least one container for storing milk to be foamed, providing a fluid and a fluid line, conveying, by a pump, a predefinable amount of the milk to be foamed through a line system, which includes a milk intake line, between the at least one container and the pump, and an outlet line, between the pump and at least one outlet, potentially supplying air into the milk intake line via an air-flow regulator, which can be arranged in an air-supply line, in order to produce a milk/air mixture upstream of the pump, conveying the milk/air mixture or the milk through a heating element, producing a milk foam from the milk/air mixture by a throttle device; and dispensing the milk foam or milk at the at least one outlet. An apparatus is also provided.

17 Claims, 1 Drawing Sheet

(56) References Cited

U.S. PATENT DOCUMENTS

| | | | | |
|---|---|---|---|---|
| 2019/0274472 | A1* | 9/2019 | Epping | A47J 31/4485 |
| 2020/0054163 | A1* | 2/2020 | Epping | A47J 31/4496 |
| 2020/0179881 | A1* | 6/2020 | Nagasawa | B01F 23/232 |
| 2023/0348254 | A1* | 11/2023 | Dees | A47J 31/542 |

FOREIGN PATENT DOCUMENTS

| | | | | |
|---|---|---|---|---|
| WO | 2017155403 | A1 | 9/2017 | |
| WO | WO-2019072583 | A1 * | 4/2019 | A47J 31/4485 |

* cited by examiner

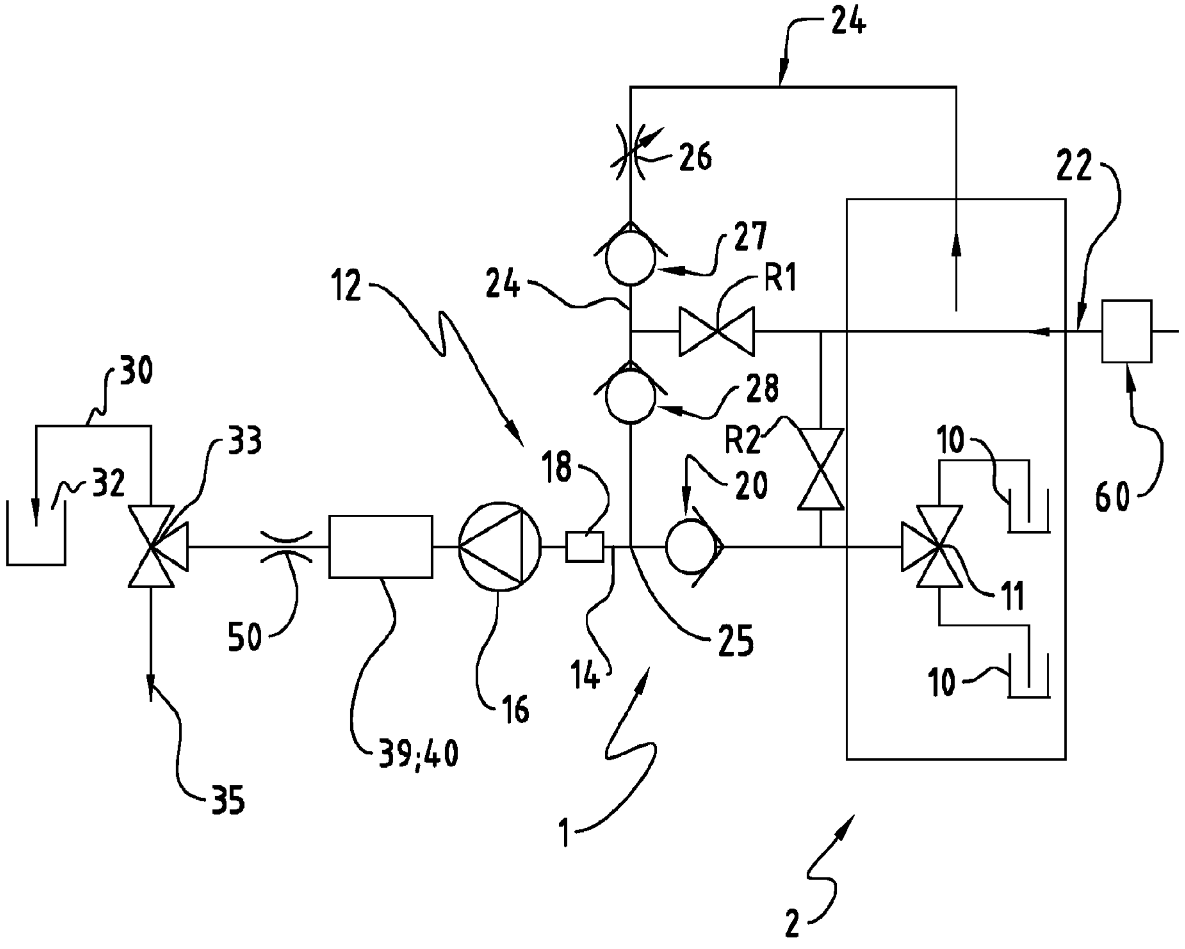
24
26
22
27
12
24
R1
30
28
33
R2
10
32
18
20
11
60
50
25
14
10
16
35
39;40
1
2

METHOD AND APPARATUS FOR PRODUCING TEMPERATURE-CONTROLLED MILK FOAM AND/OR MILK

BACKGROUND AND SUMMARY

The present invention relates to a method and an apparatus for producing temperature-controlled milk foam and/or milk, more specifically for selectively producing cold, warm or hot milk foam or milk.

Methods and apparatus for selectively producing cold, warm or hot milk and/or milk foam are known in particular in combination with beverage makers, e.g., coffee machines. Depending upon the selected beverage and/or coffee specialty, e.g., cappuccino, latte macchiato, café latte, chocolate or chai, the quantity but also the temperature of the provided milk and/or of the provided milk foam varies. To produce milk foam, milk is generally sucked from a container by means of a pump and mixed with supplied air or gas during a flow path to an outlet, in order to then be brought as a milk/air mixture in a heating unit to a definable temperature and processed into a foam. For reasons of shelf-life and hygiene, the milk is stored in a cool place, especially at temperatures between 3° C. and 7° C. The heating element in which the milk or milk foam is temperature-controlled and possibly produced can be a flow heater, for which different types are suitable.

In general, there are different ways to generate milk foam. For example, air, gas or hot steam can be mixed with the milk in a foaming unit in such a way that the turbulence generated causes the milk to foam up and form a more or less stable foam. The foaming can also be done by mechanical stirring or by means of a throttle device.

In known processes and devices, it is often provided that, depending on the selected temperature for the milk and the milk/air mixture or the milk foam, different flow paths are provided, often running in parallel. Cold milk is conveyed to the outlet via a first flow path, while warm milk is conveyed via a second flow path, in which in particular a continuous flow heating element is arranged. However, these parallel flow paths not only mean a complex line system and a large number of switchable components, but also pose a problem in terms of contamination and bacterial growth, as well as with respect to cleaning.

Known systems with only one single milk line foresee that, regardless of which temperature is to be set in the milk, milk-air mixture or milk foam, a heating element must always be passed. The disadvantage of such a system is that if cold milk or cold milk foam is to be provided immediately after hot milk or hot milk foam has been dispensed, the cold milk or cold milk foam is heated by the residual heat of the heating element when the heating element is switched off. Accordingly, it is known for the switched-off continuous flow heating element to be at least partially cooled by cold milk or rinsing liquid flowing in and possibly also cleaned Known from WO 2017/155403 is an arrangement for producing hot or cold milk foam, which types of foam can be made available relatively shortly after one another. The switching of a flow-through heating unit into an active and an inactive state is thereby provided for. The flow-through heating unit is designed as a thick-film heating element with a small thermal mass. The thermal behavior of the thick-film heating element is precisely defined in order to take account of the thermal inertia immediately after the thick-film heating element is switched on or respectively off. In particular, the thermal behavior immediately after switching off is defined, i.e. when, after the production of warm or hot milk foam with the heating unit switched on, this element is switched off in order to provide cold or only slightly heated milk foam immediately afterwards. The thick-film heating element is thus set up so that a small quantity of milk of about 40 to 60 ml in the foamed state and with a temperature of less than about 7° C. is heated in a fluid channel of the thick-film heating element to a temperature of less than 20° C. as it flows through the flow-through heating unit, which has been inactive for less than 10 seconds. Accordingly, no cold beverage can actually be provided for the first draw, since the temperature should be <10° C., in particular ≤7° C., for this. But even if a larger quantity of milk of 60 to 80 ml is required to prepare a beverage, the first dispensing is usually too warm, and a cold beverage can only be provided with the second dispensing. Consequently, switching between a hot drink and a cold drink is often only achievable with extensive rinsing with cold milk, which can make the system unprofitable and problematic with regard to the formation of a milk skin.

Generally, when a flow-through heating unit, designed as thick-film heating element, is switched on, the heating unit heats up first, before the desired temperature in the enclosed fluid channel is reached, after a certain delay. This temperature is decisive for the heating of the milk foam flowing in the fluid channel. Even if the thick-film heating element should have a small thermal mass and a steep heating profile, the heating of the milk foam follows a flat heating curve, i.e. the heating and cooling phases are subject to a certain time and/or thermal delay. In a so-called overshooting heating system, local overheating can occur during the heating phase, which is detrimental in many ways for food and with respect to the deposits that form in the fluid channel during overheating.

Flow-through heating elements designed as thick-film heating elements for the generation of temperature-controlled milk foam are already known. A thick-film heating element is generally a layered composite comprising a carrier substrate, e.g. a metal element, covered with a dielectric coating, e.g. a glass ceramic layer, which on the one hand acts as an insulator and on the other hand carries conductor tracks, made of an electrically conductive material, which generate heat in the activated state. The generated heat can be transferred to a fluid flowing in a meandering or spiral fluid channel, for example, formed on the thick-film heating element. In particular, the size, shape and/or electrical properties of the thick-film heating element can be adapted to the respective task or application. In addition, temperature sensors and other features can be integrated. Thick-film heating elements are characterized by a steep temperature profile or heating profile and thus by a very fast and short response time, so that a thick-film heating element is above all not used in a stand-by mode.

In contrast to the known processes and devices, the production of cold, warm or hot milk or milk foam is achieved according to an aspect of the invention with a simple process sequence and a simple design of the apparatus, i.e. without parallel flow paths and complex switching of components, as well as without a delay through selectively switching a heating unit on or off.

The method according to an aspect of the invention for selectively producing cold, warm or hot milk foam and/or milk comprises the following steps:

- providing at least one container for storing milk to be foamed;
- providing a fluid and a fluid line;

conveying, by means of a pump, a predefinable amount of the milk to be foamed through a line system, which comprises a milk intake line, between the at least one container and the pump, and a single outlet line, between the pump and at least one outlet;

potentially supplying air into the milk intake line via an air-flow regulator in order to produce a milk/air mixture upstream of the pump;

conveying the milk/air mixture or the milk through a heating element, which is designed as a flow heater and is arranged in the outlet line and is in the form of a thick-film heating element; and dispensing the milk foam or milk at the at least one outlet.

The method according to an aspect thereof is characterized by the fact that the thick-film heating element is permanently heated to a predetermined temperature, and after each delivery of the milk foam or milk, the fluid is applied to the line system at least in part. In particular, fluid can be applied to the system located outside a cooling area. Water, in particular filtered water, is suitable as fluid.

Surprisingly, it has been shown that in contrast to the known methods for selectively producing cold, warm or hot milk foam with only a single flow path downstream of the pump, i.e. a simple line system, the stand-by mode of a flow heater designed as a thick-film heating element is very advantageous. This is in contrast to the conventional operation of flow heaters designed as thick-film heating elements. These are designed to avoid a sluggish and prolonged response time when switching between active and inactive states and thus a stand-by mode. The stand-by mode means that the thick-film heating element is permanently temperature-controlled at a pre-determined temperature when the apparatus for producing temperature-controlled milk foam or milk is in operation.

It is advantageous that in stand-by mode, i.e. in the active state of a switchable heating unit, the heating phase is significantly shorter and more reliable in the event of a further temperature increase than in the case of a switched-off and cooled-down heating unit. In addition, a time delay in setting the temperature in the fluid channel can be largely avoided. Although the heating phase is shortened even with heating units designed as thick-film heating elements with a small thermal mass and a very steep heating profile, it still takes a certain amount of time until the flowing fluid is heated to the desired temperature. This is particularly disadvantageous if the milk or milk foam is only to be heated in small quantities. For certain coffee specialties, only small quantities of temperature-controlled milk or milk foam are required, so that the required temperature of the small quantity of milk or milk foam is not reached due to a delay in heating. A small cappuccino with about 80 ml of milk foam or a so-called cortado with an even smaller amount of milk foam could ultimately be too cold because of this. A sluggish and longer response time of the heating unit used for heating milk and/or milk foam is particularly disadvantageous with small amounts of milk foam or milk to be heated.

According to one embodiment of the method, it is provided that the fluid, preferably water, is discharged from the line system via a manifold valve only before milk foam and/or milk is dispensed at the at least one outlet provided for this purpose. Accordingly, between two deliveries of milk foam and/or milk, the line system and in particular the heating element, which is designed as a thick-film heater, is exposed to the fluid. This proves to be advantageous in many ways, as will be explained later.

According to an aspect of the invention the thick-film heating element remains permanently in an active state and is therefore not switched on and off as required. Preferably the thick-film heating element is heated to a temperature between 60° C. and 70° C. This means that the fluid channel in the thick-film heating element is also permanently at a correspondingly high temperature.

In the event that the temperature of the thick-film heating element needs to be increased further to produce hot milk foam or hot milk, it only needs to be increased by a relatively small temperature difference. This temperature difference can be, for example, about 4° C. to 7° C. This small temperature difference according to a preferred embodiment can be overcome quickly and safely. Local overheating, caused by overshooting in the control of the heating unit and thus the temperature of the thick-film heating element, can be avoided by the small temperature difference to be overcome.

According to an aspect of the invention, for the production of temperature-controlled milk foam and/or milk, in particular cooled milk with a temperature of 3° C. to 7° C. can be conveyed through the line system via the milk intake line by means of the pump. In order to achieve a temperature of the milk foam and/or milk at a delivery point or outlet of approximately 64° C. to 68° C., whereby cooling off of the milk foam and/or milk on the flow path to the delivery point must also be taken into account, the temperature of the heating element should be approximately 70° C. to 75° C.

Until now, systems were known in which a heating element in the form of a thick-film heating element had to be switched from a deactivated or switched-off state to an activated or switched-on state in order to control the temperature of the milk foam or milk, whereby the heating element heats up according to a heating profile starting from a low temperature. During this heating phase, local overheating can occur. This can be observed with heating units that are known per se, whereby after a sudden change in an input variable, an output variable initially exceeds a setpoint value and only then does the desired value of this output variable set in. When a thick-film heating element is switched on and heated up, the temperature can briefly rise above the actual set temperature, whereby a local overheating can take place. This overheating has a negative effect on the milk foam or milk to be heated, especially if it leads to corresponding denaturation of the milk proteins and thus to deposits.

According to one embodiment, the application of fluid to the line system, e.g. tap water, after each delivery of milk foam and/or milk can cool or heat at least sections of the line system and the components arranged thereon, depending on the temperature of the fluid supplied in particular into the milk intake line. But also independent of the temperature of the fluid that can be supplied, it is heated by the heat transferred by the heating element, so that at least sections of the line system, in particular the outlet line and the at least one outlet itself, are also heated. Heated line sections and components arranged thereon prove to be extremely advantageous in order to be able to make the milk foam heated in the heating element or the heated milk available at the at least one outlet without any appreciable cooling.

If, on the other hand, cold milk foam or cold milk is requested, for example, by a user, the method according to one embodiment of the invention provides that the line system and the heating element in the form of a thick-film heating element are flushed with fluid so that the thick-film heating element is cooled by the flowing fluid in a period of >10 s to a temperature preferably corresponding to the cooling temperature in the cooling device, i.e. to ≤7° C. In particular, the aim can be to cool the fluid to a temperature ≤4° C. in order to largely compensate for heating during the flow path and the elements arranged on it. In one embodiment, the fluid used is water, which can be provided by a municipal supply network, for example. It should be noted that so-called tap water has different temperatures depending on the environment and the season, which is also referred to as the water inlet temperature. The temperature of tap water can be between 10° C. and 25° C. depending on the season.

In a preferred embodiment, the fluid, e.g. the tap water provided via the supply network, can be cooled by means of a cooling unit. The temperature of the milk cooled and stored in a cooling unit can serve as an orientation for the cooling temperature to be set. The cooling of the milk or also of parts of the apparatus can be designed to also cool the fluid to a temperature of 7° C. Alternatively, the fluid can be cooled in a separate cooling unit, which can be attached to the fluid line, for example. This avoids the situation where the first cold beverage actually has a higher temperature than desired. The cooled fluid can, for example, be cooled via a cooling unit arranged in the supplying fluid line, so that rinsing of the line system with cold fluid is also possible even if, for example, the fluid in the fluid line itself is already heated at a high ambient temperature. One of the possibilities for efficient temperature control of the fluid is the use of a latent heat accumulator with a phase change material (PCM), which is known and can be used in various forms. The phase-change material can be used to store heat and cold and to limit temperature peaks. The phase-change material has a high storage volume so that the latent energy stored during a phase change can be used for heat management. PCM technology uses the effect that during a transition, e.g. from solid to liquid phase, the temperature remains constant as long as both aggregate states are present at the same time. The latently stored energy is available again during the reverse process. The PCM and in particular the melting temperature of the material can be selected according to the conditions of use. For example, aqueous salt solutions are suitable for cooling tasks, whereby the phase-change material can be used in closed containers, bound in matrix and/or carrier structures and/or microencapsulated.

Thus, with the use of PCM technology, a further cooling of the fluid or tap water can be achieved. The heating element designed as a thick-film heating element can therefore not only be cooled to the temperature of the tap water, i.e. to 10° C. to 25° C., but can also be cooled in the switched-on state in such a way that a temperature of the milk and/or the milk foam of ≤7° C. at the outlet is achievable more quickly. With a corresponding design of the cooling, temperatures in the range of 4° C. to 7° C., in particular ≤4° C., can be achieved.

It can be particularly advantageous that the cooling of the stored milk uses PCM technology in order to also cool the fluid or tap water used for applying and rinsing.

The flushing of the line system with fluid takes place in one position of a valve arrangement, arranged in the outlet line and preferably designed as a manifold valve, which allows the fluid to be discharged from the line system. In another position of the manifold valve, the fluid can be conducted in the circuit. The manifold valve can be switched by means of a control unit, whereby the control unit can control further components. The control unit can be designed to control the process for producing temperature-controlled milk foam and/or milk depending on an instruction from a user.

According to an aspect of the invention, an apparatus is proposed for the production of cold, warm and hot milk foam and/or milk according to the method according to an aspect of the invention. The apparatus comprises at least one container in which milk to be foamed is stored, a pump, a line system comprising a milk intake line via which the at least one container is connectible to the pump and a single outlet line via which the pump is connectible to at least one outlet. Furthermore, a fluid line is provided via which the line system can be supplied with a fluid. Also included are an air-flow regulator, by means of which air can be supplied in a metered manner via an air-supply line at an inlet point into the milk intake line, a heating element designed as a flow heater, which is arranged in the outlet line and designed as a thick-film heating element, and a throttle device, which can be arranged downstream of the pump in the outlet line.

In order to produce milk foam from a milk/air mixture, the throttle device can be arranged in the outlet line downstream of the pump and preferably downstream of the heating element designed as a thick-film heating element. The throttle device can be designed as a fixed or adjustable nozzle or orifice and comprises in particular an adjustable constriction of the flow cross-sectional area. The throttle device is set up to generate a counter-pressure which is advantageously effective in the heating element designed as a thick-film heating element. The generated counter-pressure counteracts the expansion of air bubbles in the milk/air mixture that takes place with increasing temperature. This prevents large air bubbles, which not only reduce the quality and stability of the milk foam, but also have a negative effect on heat transfer, as air is a poor conductor of heat.

In one embodiment of the apparatus, the heating element in the form of a thick-film heating element has an electrical resistor mounted on a carrier and a fluid channel in contact with the heating element.

Advantageously, the apparatus can be at least partially arranged in a cooling device.

Furthermore, the apparatus can comprise a conductance sensor, which is set up to determine a conductance of a medium in the line system. The conductance value can be used to determine which medium is involved, in particular milk, milk/air mixture, fluid or air.

According to one embodiment, a manifold valve is provided in the outlet line, which selectively connects the outlet line to a drain for discharging fluid, to a circuit line for circulating fluid through the line system or to the at least one outlet at which milk foam and/or milk can be dispensed. The at least one outlet can be designed as an outlet nozzle. A line section between the manifold valve and the at least one outlet can be dimensioned in such a way that it has only a small filling volume, for example of about 2 to 3 ml.

In one embodiment of the invention, it is further provided that a first non-return valve and a second non-return valve are arranged in the air-supply line. Between the first non-return valve and the second non-return valve, fluid can be fed into the air supply line via a first valve R1. Accordingly, the first valve R1, which can be regulated by the control unit, is provided in the fluid line in a flow path to the air-supply line. The first non-return valve and the second non-return valve can preferably be switched independently of each other.

Preferably, the first non-return valve and the second non-return valve are designed as direct-closing non-return valves, which can be arranged in a vertical orientation in the air-supply line, so that the flow can pass through them from top to bottom. Direct-closing non-return valves generally comprise a closing element which can be pressed into its seat by a medium and/or due to gravity. Delays and vibrations during the closing process can be reduced. Thus, by means of the vertical orientation of the first non-return valve and the second non-return valve in the air supply line, an exact dosage of the air volume can be achieved by means of the air-flow regulator also arranged in the air supply line. With this arrangement, the supplied fluid can also be used, if necessary, to flush at least parts of the air supply line, which is advantageous with regard to exact air volume metering.

Alternatively or additionally, it can be provided that the fluid can be fed via the fluid line into the milk intake line in order to largely apply it on, or flush, the sections of the line system carrying the milk or the milk/air mixture or the milk foam with the fluid. A second valve R2, which can be regulated by a control unit, is provided in the fluid line and controls the introduction of the fluid into the milk intake line.

In particular, the fluid is water, which can be provided via a water line. Since, depending on the ambient temperature and the season, the water conducted in a water line may already have a higher temperature, e.g. water of more than 20° C. is initially drawn from the water line in the summer months, a cooling unit can be provided in one embodiment of the invention, by means of which the fluid can be cooled to a low temperature, in particular to a temperature ≤7° C.

With the method and apparatus according to aspects of the invention for producing selectively cold, warm or hot milk foam and/or milk, the heating element in the form of a thick-film heating element can always be kept in an activated state, at least when a beverage maker connected thereto is also in operation. Since fluid is applied to the line system and the flow heater, in the form of a thick-film heating element, between two milk or milk foam deliveries, the thick-film heating element can always be kept in a stand-by mode and at a high temperature, so that only short heating phases or cooling phases of the thick-film heating element, if required, have to be taken into account.

BRIEF DESCRIPTION OF THE DRAWINGS

One embodiment example of the invention will be explained more closely in the following with reference to a drawing:

FIG. 1 shows schematically an apparatus according to the invention for selectively producing cold, warm or hot milk foam and/or milk.

DETAILED DESCRIPTION

The embodiment shown schematically in FIG. 1 of an apparatus 1 according to the invention is set up to produce selectively cold, warm or hot milk foam and/or milk. The milk to be foamed or another liquid to be foamed is stored in a container 10, which is preferably provided in a cooling unit 2. Preferably, the cooling system 2 can be designed in such a way that the apparatus 1 can be at least partially accommodated in it. Since a variety of milk types are available today, a plurality of storage containers 10 can be provided, in each of which one milk type can be stored. A milk intake line 14 included in a line system 12 leads from the at least one container 10 to a suction side of a pump 16 in order to draw milk from the at least one container 10 when a correspondingly provided shut-off valve 11 opens the flow path.

In the illustrated embodiment, a conductance sensor 18 is arranged in the milk intake line 14, which is set up to determine the type of medium conveyed in the milk intake line 14 by measuring a conductance, i.e. whether it is milk, fluid or water, rinsing solution or air.

Furthermore, a valve 20 is arranged in the milk intake line 14, which opens the milk intake line 14 in the direction of the suction side of the pump 16 and is designed as a non-return valve.

Upstream of the valve 20, a fluid line 22 opens into the milk intake line 14, via which a fluid can be supplied. In particular, the fluid is water, which is preferably applied on the line system 12 at a definable temperature. By applying or application can be understood both a filling and holding as well as a rinsing. The fluid, which can be introduced into the milk intake line 14 by means of the fluid line 22, which can be shut off by a second valve R2, can preferably be introduced into the apparatus 1 in a regulated manner by a control unit (not shown) between two deliveries of milk and/or milk foam and, in particular, remain therein until a new delivery of milk foam and/or milk is requested On the suction side of the pump 16, the line system 12 further comprises an air-supply line 24 for the metered and controlled introduction of air into the milk intake line 14 at an inlet point 25. An air-flow regulator 26 is provided for this purpose, for example in the form of a proportional valve. With this, a precisely determinable amount of air can be introduced into the line system 12 or mixed with the milk being conveyed, so that a milk/air mixture is present in the milk intake line 14 downstream of the introduction point 25, which mixture is conveyed by the pump 16.

FIG. 1 shows that a first non-return valve 27 and a second non-return valve 28 are provided in the air-supply line 24. The first non-return valve 27 and/or the second non-return valve 28 can be designed as directly closing non-return valves and arranged in a vertical orientation so that the force of gravity acting on an encompassed closing element supports the opening of the first non-return valve 27 and/or the second non-return valve 28. Accordingly, the air-supply line 24 opens even if the negative pressure generated may not be quite sufficient for air intake.

A section of the fluid line 22 opens between the first non-return valve 27 and the second non-return valve 28, so that when the first valve R1 is open in this section, fluid is introduced into the air-supply line 24 and can thus also flush this section of the line system 12. A cooling unit 60 can be provided to cool the fluid that can be introduced into the line system by means of the fluid line 22. The cooling unit 60 can be designed as a latent heat accumulator with a phase-change material (PCM). By means of the PCM technology used, tap water provided by a supply network can be cooled down to a temperature ≤7° C. Accordingly, the temperature of the fluid, in particular the tap water, can be adjusted independently of the ambient temperature and the temperature of the tap water in the supply network. Alternatively, the cooling system 2 for the milk and parts of the apparatus 1 can also be designed as a latent heat accumulator with PCM in order to cool the fluid accordingly.

The pump 16 is connected on its pressure side via a single outlet line 30 to an outlet 32, at which processed milk and/or processed milk foam can be dispensed. Upstream of outlet 32, a manifold valve 33 is arranged to provide selectively a flow in the direction of outlet 32 or in the direction of a drain 35. In a further position of the manifold valve 33, a circuit flushing can also be enabled.

Downstream of the pump 16, a flow heater is provided in the outlet line 30, which is a heating element 39 designed as a thick-film heating element 40. The heating element 39 comprises an electrical heating resistor mounted on a carrier and a fluid channel through which a fluid to be heated can flow. According to the invention, the heating element 39, which is designed as a thick-film heating element 40, is permanently in an active state and is thus always heated to a temperature of, for example, approximately 60° C. to 70° C. It is further provided that between two deliveries of milk foam and/or milk at outlet 32, fluid is applied to the line system 12. The application of the fluid causes the line system 12 to be at least partially filled with fluid between two deliveries of milk foam and/or milk. The filling of the line system 12 and of the thick-film heating element 40 reduces the risk of overheating and makes it possible for the section of the outlet line 30 extending from the thick-film heating element 40 as well as the components connected to it, e.g. the outlet 32, to heat up.

Furthermore, a throttle device 50 is arranged in the outlet line 30, in particular downstream of the thick-film heating element 40, which throttle device is preferably adjustable by means of a control unit (not shown). By means of the throttle device 50, the stability and quality of the milk foam produced can be positively influenced.

In each case before the temperature-controlled milk foam and/or milk is drawn from outlet 32, the fluid is discharged from line system 12 via manifold valve 33. To produce warm milk foam and/or milk, the milk/air mixture or milk is passed through the heated heating element 39 and the heated section of the outlet line 30. For example, to produce hot milk foam and/or milk, the temperature of the thick-film heating element 40 can be increased by a small temperature difference so that the milk/air mixture and/or milk flowing through can be heated so that it has a temperature in the range of approximately 64° C. to 68° C. at outlet 32. Cooling of the milk foam and/or milk in the line system 12 is significantly reduced by the temperature-controlled flow path. Even small amounts of milk/air mixture or milk can thereby be brought to the correct temperature in a very short period of time.

In order to produce cold milk foam and/or cold milk, it is no longer necessary with the device and method according to the invention to switch off the heating element 39, which is designed as a thick-film heating element 40, and to take into account the thermal behavior of the same. Instead, it is provided that when the manifold valve 33 is open, the fluid located in the line system is discharged and cold fluid or respectively fluid cooled by means of a cooling unit 60 is sucked by means of the pump 16 via the fluid line 22 into the line system 12 and conveyed therein, so that by means of the cool fluid flowing in the fluid channel of the thick film heating element 40, this fluid channel is cooled to such an extent that the subsequent milk/air mixture or milk is not, or only slightly, heated, despite the thick-film heating element 40 being switched on.

The invention claimed is:

1. A method for selectively producing cold, warm or hot milk foam and/or milk, the method comprising the following steps:
- providing at least one container for storing milk to be foamed;
- providing a fluid and a fluid line;
- conveying, by means of a pump, a predefinable amount of the milk to be foamed through a line system, which comprises a milk intake line, between the at least one container and the pump, and an outlet line, between the pump and at least one outlet;
- producing a milk/air mixture upstream of the pump;
- conveying the milk/air mixture or the milk through a heating element, which is designed as a flow heater and is arranged in the outlet line and is in the form of a thick-film heating element;
- producing a milk foam from the milk/air mixture by means of a throttle device; and
- dispensing the milk foam or milk at the at least one outlet,
  - wherein the thick-film heating element is permanently heated to a predefinable temperature, and after each action of dispensing of the milk foam or the milk, fluid is applied to the line system at least in part.

2. The method for selectively producing cold, warm or hot milk foam and/or milk according to claim 1, wherein before a dispensing of milk foam or milk at the outlet the fluid is conveyed out of the line system via a manifold valve.

3. The method for selectively producing cold, warm or hot milk foam and/or milk according to claim 1, wherein the fluid is water.

4. The method for selectively producing cold, warm or hot milk foam and/or milk according to claim 1, wherein the thick-film heating element is permanently heated to a temperature between 60° C. and 70° C.

5. The method for selectively producing cold, warm or hot milk foam and/or milk according to claim 4, wherein for producing hot milk foam and/or milk the temperature of the thick-film heating element is increased by about 4° C. to 7° C.

6. The method for selectively producing cold, warm or hot milk foam and/or milk according to claim 1, wherein for producing cold milk foam and/or cold milk the line system and the thick-film heating element is rinsed with a feedable fluid, so that the thick-film heating element is cooled by the feedable fluid flowing through in a time period of >10 s to a temperature of ≤7° C.

7. The method for selectively producing cold, warm or hot milk foam and/or milk according to claim 6, wherein the feedable fluid has a temperature of ≤7° C.

8. The method for selectively producing cold, warm or hot milk foam and/or milk according to claim 7, wherein the feedable fluid is cooled to the temperature ≤7° C. by means of a cooling unit designed as a latent heat accumulator with a phase-change material.

9. The method for selectively producing cold, warm or hot milk foam and/or milk according to claim 1, wherein a control unit controls the method according to an instruction generated by a user.

10. The method for selectively producing cold, warm or hot milk foam and/or milk according to claim 1, comprising supplying air into the milk intake line via an air-flow regulator to produce the milk/air mixture upstream of the pump.

11. An apparatus for selectively producing cold, warm or hot milk foam and/or milk, the apparatus comprising
- at least one container in which milk to be foamed is stored,
- a pump,
- a line system, the line system comprising
  - a milk intake line, via which the at least one container is connectible to the pump, and
  - an outlet line, via which the pump is connectible to at least one outlet, and
  - a fluid line, via which fluid is able to be applied to the line system,
- an air-flow regulator, by means of which air is able to be conveyed in a metered way via an air-supply line at an inlet point into the milk intake line,
- a heating element designed as a flow heater, which is arranged in the outlet line and designed as a thick-film heating element, a throttle device arranged downstream of the pump in the outlet line, and a latent heat accumulator with a phase-change material, the latent heat accumulator being arranged for controlling a temperature of the milk and/or fluid.

12. The apparatus for selectively producing cold, warm or hot milk foam and/or milk according to claim 11, wherein the thick-film heating element comprises an electrical resistor installed on a support and a fluid channel in contact with the heating element.

13. The apparatus for selectively producing cold, warm or hot milk foam and/or milk according to claim 11, wherein the apparatus is arranged at least partially in a cooling system.

14. The apparatus for selectively producing cold, warm or hot milk foam and/or milk according to claim 11, wherein the latent heat accumulator is arranged to cool the milk and/or fluid to a temperature ≤7° C.

15. The apparatus for selectively producing cold, warm or hot milk foam and/or milk according to claim 11, wherein a conductance sensor is provided for determining a conductance of a medium in the line system.

16. The apparatus for selectively producing cold, warm or hot milk foam and/or milk according to claim 11, wherein a manifold valve is provided in the outlet line, which connects the outlet line selectively to a drain for discharging the fluid or to at least one outlet at which milk foam or milk can be dispensed.

17. The apparatus for selectively producing cold, warm or hot milk foam and/or milk according to claim 11, wherein a first non-return valve and a second non-return valve are arranged in the air-supply line in a vertical orientation and so that flow can pass through them from top to bottom, these being designed as directly closing non-return valves, and fluid can be introduced into the air-supply line between the first non-return valve and the second non-return valve via a valve.

* * * * *